US012658419B2

(12) United States Patent
Mullen

(10) Patent No.: US 12,658,419 B2
(45) Date of Patent: Jun. 16, 2026

(54) METHODS AND APPARATUS FOR MSn MASS SPECTROMETRY

(71) Applicant: Thermo Finnigan LLC, San Jose, CA (US)

(72) Inventor: Christopher Mullen, Menlo Park, CA (US)

(73) Assignee: Thermo Finnigan LLC

( * ) Notice: Subject to any disclaimer, the term of this patent is extended or adjusted under 35 U.S.C. 154(b) by 524 days.

(21) Appl. No.: 17/825,274

(22) Filed: May 26, 2022

(65) Prior Publication Data

US 2023/0386819 A1 Nov. 30, 2023

(51) Int. Cl.
*H01J 49/42* (2006.01)
*H01J 49/00* (2006.01)

(52) U.S. Cl.
CPC ...... *H01J 49/4215* (2013.01); *H01J 49/0031* (2013.01); *H01J 49/0036* (2013.01); *H01J 49/0045* (2013.01)

(58) Field of Classification Search
CPC ............... H01J 49/4215; H01J 49/0031; H01J 49/0036; H01J 49/0045; H01J 49/004
USPC .................................................. 250/281, 282
See application file for complete search history.

(56) References Cited

U.S. PATENT DOCUMENTS 6,753,523 B1 6/2004 Whitehouse et al.
7,145,133 B2 * 12/2006 Thomson ............ H01J 49/4225 250/281
8,803,081 B2 8/2014 Kenny
9,105,456 B2 8/2015 Jiang et al.
9,281,172 B2 * 3/2016 Bateman ............... H01J 49/062
2009/0179150 A1 7/2009 Kovtoun et al.
2010/0193680 A1 8/2010 Makarov et al.
2016/0181084 A1 * 6/2016 Smith .................. H01J 49/426 250/282

OTHER PUBLICATIONS

Cousins et al. "MS3 using the collision cell of a tandem mass spectrometer system" Rapid Communications in Mass Spectrometry 2002, vol. 16, pp. 1023-1034.

(Continued)

*Primary Examiner* — Michael Maskell
(74) *Attorney, Agent, or Firm* — Thomas F. Cooney

(57) ABSTRACT

A mass spectrometry method comprises: choosing an RF drive frequency that best optimizes isolation of a precursor ion species of interest by a quadrupole mass filter (QMF); isolating the precursor ion species by passing ions through the QMF while the chosen RF drive frequency is applied thereto; fragmenting the precursor ion species, thereby generating a plurality of first-generation fragment ion species; returning the plurality of first-generation fragment ion species to an inlet end of the QMF; choosing a second quadrupole RF drive frequency that best optimizes isolation of a first-generation fragment ion species of interest by the QMF; isolating the first-generation fragment ion species of interest by passing the fragment ions through the QMF while the second chosen RF drive frequency is applied thereto; fragmenting the chosen first-generation fragment ion species of interest, thereby generating a plurality of second-generation fragment ion species; and mass analyzing the second-generation fragment ion species.

11 Claims, 5 Drawing Sheets

(56) References Cited

OTHER PUBLICATIONS

Koppen et al. "Multi-stage Mass Spectrometry up to MS4 on a QTof System" Water Solution, Sep. 2014, 6 pages.
Anonymous: "Resonant Circuit for Generating Two Radio Frequency (RF) Frequencies," Research Disclosure, Jan. 2020, Database No. 669062, 3 pages.

* cited by examiner

METHODS AND APPARATUS FOR MSn MASS SPECTROMETRY

TECHNICAL FIELD

The present invention relates to mass spectrometers and mass spectrometry. More particularly, the present invention relates to methods and apparatus for "MSn" mass spectrometry in which analytes are identified or quantified after two or more successive stages of ion product ion generation by means of ion fragmentation or other ion-molecule or ion-ion reactions.

BACKGROUND

The mass spectrometric analysis of molecules is complicated by the presence of many different molecules having closely similar mass to charge ratios. Fragmentation techniques and other ion reaction techniques have been developed to help identify the different parent molecules by measuring the mass to charge ratios of their characteristic fragments or other reaction products. According to such procedures, ions having a mass-to-charge-ratio (m/z) in proximity to a targeted m/z of a molecule of interest are selected by a mass selective ion optical device. These ions are usually referred to as "parent ions" or "precursor ions". These precursor ions are then fragmented or otherwise reacted using one or more processes, and the fragment ions or reaction-product ions are mass analyzed, the mass analysis of the fragments or other reaction products providing a so-called "MS/MS mass spectrum" or "tandem mass spectrum". Fragment ions and other reaction-product ions are herein all referred to as "product ions".

Molecules of different structure typically fragment to form different fragment ions, and the parent molecules can usually be identified by studying the m/z values of those fragment ions. Occasionally, one stage of ion fragmentation or ion reaction is not sufficient to uniquely identify a parent molecule. Thus, if the MS/MS mass spectra contain interferences from other ions, or if a greater amount of information than is present in MS/MS is required, one or more further stages of fragmentation or other ion reaction may be employed. For example, a mass spectrum of a second generation of fragment ions that are produced by isolating and fragmenting a subset of the first-generation fragment ions is often referred to as an "MS/MS/MS" mass spectrum or, more succinctly, an "$MS^3$" or "MS3" mass spectrum. More generally, mass spectra obtained after n−1 stages of fragmentation or ion reaction are herein referred to as either "$MS^n$" or "MSn" mass spectra. Algorithms and/or tables have been developed for the purpose of matching fragment ion spectra, as generated by one or more stages of fragmentation, to likely parent molecules.

FIG. 1 is a schematic illustration of one example of a conventional mass spectrometer system, shown generally at 10, that is capable of performing ion fragmentation and, thus, generating tandem mass spectra. As illustrated in FIG. 1, the conventional mass spectrometer system 10 is a triple-quadrupole system comprising a first quadrupole device 32, a second quadrupole device 34 and a third quadrupole device 36, the last of which is a mass analyzer comprising an ion detector 40. Referring to FIG. 1, an ion source 12 housed in an ionization chamber 14 is connected to receive a liquid or gaseous sample from an associated apparatus such as, for instance, a liquid chromatograph or syringe pump through a capillary 37. As but one example, an atmospheric pressure electrospray source is illustrated.

However, any ion source may be employed, such as a heated electrospray ionization (H-ESI) source, an atmospheric pressure chemical ionization (APCI) source, an atmospheric pressure matrix assisted laser desorption (MALDI) source, a photoionization source, or a source employing any other ionization technique. The ion source 12 forms charged particles 39 (either ions or charged droplets that may be desolvated so as to release ions) representative of the sample, which charged particles are subsequently transported from the ion source 12 to the mass analyzer 36 in high-vacuum chamber 26 through intermediate-vacuum chambers 18 and 25 of successively lower pressure in the direction of ion travel. In the illustrated example, the droplets or ions are entrained in a background gas and transported from the ion source 12 through an ion transfer tube 16 that passes through a first partition element or wall 15*a* into an intermediate-vacuum chamber 18 which is maintained at a lower pressure than the pressure of the ionization chamber 14 but at a higher pressure than the pressure of the high-vacuum chamber 26. The ion transfer tube 16 may be physically coupled to a heating element or block 23 that provides heat to the gas and entrained particles in the ion transfer tube so as to aid in desolvation of charged droplets so as to thereby release free ions.

Gases and entrained ions are caused to flow through the ion transfer tube 16 into the intermediate-vacuum chamber 18 in response to the difference in pressure between the ionization chamber 14 and the intermediate-vacuum chamber 18 (FIG. 1). A second plate or partition element or wall 15*b* may separate the intermediate-vacuum chamber 18 from a second intermediate-pressure region 25; likewise, a third plate or partition element or wall 15*c* may separate the second intermediate pressure region 25 from the high-vacuum chamber 26. A first ion optical assembly 20*a*, which may comprise an ion lens, an ion funnel or another form of ion guide, provides an electric field that guides and focuses the ion stream leaving ion transfer tube 16 through an aperture 22 in the second partition element or wall 15*b* that may be an aperture of a lens or skimmer 21. A second ion optical assembly 20*b* may be provided so as to transfer or guide ions to an aperture 27 in the third plate or partition element or wall 15*c* and, similarly, another ion optical assembly 20*c* may be provided in the high vacuum chamber 26 containing the mass analyzer 36. The ion optical assemblies or lenses 20*a*-20*c* may comprise transfer elements, such as, for instance a multipole ion guide, so as to direct the ions through aperture 22 and into the mass analyzer 36. The mass analyzer 36 comprises a detector 40 whose output can be displayed as a mass spectrum. Vacuum ports 13, 17 and 19 may be used for evacuation of the various vacuum chambers.

It is to be understood that the mass spectrometer system 10 (as well as other such systems illustrated herein) is/are in electronic communication with a controller (not illustrated), which includes hardware and/or software logic for performing data analysis and control functions. Such controller may be implemented in any suitable form, such as one or a combination of specialized or general-purpose processors, field-programmable gate arrays, and application-specific circuitry. In operation, the controller effects desired functions of the mass spectrometer system (e.g., analytical scans, isolation, and dissociation) by adjusting voltages (RF, DC and AC voltages provided by various not-illustrated power supplies) applied to the various electrodes of ion optical assemblies 20*a*-20*c* and quadrupoles or mass analyzers 32, 34 and 36, and also receives and processes signals from detector 40. The controller may be additionally configured to store and run data-dependent methods in which output actions are selected and executed in real time based on the application of input criteria to the acquired mass spectral data. The data-dependent methods, as well as the other control and data analysis functions, will typically be encoded in software or firmware instructions executed by the controller.

Various modes of operation of the mass spectrometer system 10 are known. In many modes of operation, the first quadrupole device 32 may be operated as a mass selective ion guide or mass filter which allows transmission therethrough of only ions comprising a restricted m/z range of interest. In many modes of operation, the second quadrupole device 34 may be employed as a fragmentation device which causes collision induced fragmentation of the selected precursor ions through interaction with molecules of an inert collision gas introduced through tube 35. Alternatively, the second quadrupole device 34 may be configured to generate product ions by other reaction(s) between the isolated ions and specific reagent ions or molecules. The fragment ions are transmitted from the second quadrupole device 34 to the third quadrupole device 36 for mass analysis of the various ions. This sequence of operations produces an MS2 mass spectrum.

Although FIG. 1 schematically depicts a triple quadrupole mass spectrometer, MS2 mass spectrometry, as described above, may be performed using any type of mass spectrometer that has the same basic architecture — comprising a mass filter (e.g., first quadrupole 32), a mass analyzer (e.g., third quadrupole 36) and a fragmentation or reaction cell (e.g., RF-only quadrupole 34) disposed between the mass filter and mass analyzer—is as is illustrated in FIG. 1. For example, the quadrupole mass analyzer device 36 may be replaced by either a time-of-flight (TOF) mass analyzer, an electrostatic trap mass analyzer, a linear ion trap mass analyzer, a Paul trap mass analyzer, etc., without other changes in the basic mass spectrometer architecture described above.

Although MS/MS analyses may be readily performed using the basic architecture that is illustrated in FIG. 1, then, unless the third quadrupole 36 is an ion trap, then it is challenging to perform MSn analyses, where n≥3, using this simple architecture. Such higher-order MSn analyses would necessitate either additional hardware (e.g. additional mass filters and/or fragmentation cells) or else multiple passes of ions through the mass filter, each pass corresponding to a different respective generation of fragment ions. Frequently, different generations of ions that are to be isolated by the single mass filter have widely different m/z values. For example, during structural elucidation of a lipid bound to a protein target, electrospray-generated precursor ions of the protein complex may have m/z values in the 8,000-9000 Th region, whereas lipid moieties liberated from the complex may have m/z values on the order of a few hundred thomsons. As is known, the efficacy of transmission and/or isolation of any particular m/z by a quadrupole apparatus is dependent on the apparatus geometry and the frequency and voltage of an RF voltage waveform that is applied to the quadrupole rods of that apparatus. The RF frequency that is optimal for transmission and isolation of any ion species depends on the m/z value of that species. Based on the above considerations, there is a need to be able to optimize quadrupole mass filter performance for each of the various m/z ranges that may require isolation during MSn analyses. Similarly, there is a need to be able to optimize quadrupole mass analyzer performance for each of the various m/z ranges for which mass spectral analysis may be required during an MSn analytical procedure.

SUMMARY

The inventor has recognized that, by operating a quadrupole apparatus (having fixed radius, $r_0$, and length, L) with analog RF circuitry that is capable of resonating at two or more discrete frequencies, the mass range of the device can be rapidly altered with the change in the RF drive frequency. Under these circumstances, it is therefore possible to conduct multi-pass MSn experiments in an optimized fashion by appropriate choice of RF frequency that is appropriate for each m/z range of interest. Therefore, according to a first aspect of the present teachings, a method of operating a mass spectrometer comprises the steps of:

(a) choosing a quadrupole RF drive frequency that best optimizes isolation of a precursor ion species of interest by a quadrupole mass filter;

(b) isolating the precursor ion species of interest by causing ions from an ion source to pass through the quadrupole mass filter while the chosen RF drive frequency is applied to the rod electrodes thereof;

(c) fragmenting or reacting the precursor ion species using a fragmentation or reaction cell, thereby generating product ions comprising a plurality of first-generation product-ion species having various product-ion m/z values;

(d) returning the plurality of first-generation product-ion species back to an inlet end of the quadrupole mass filter;

(e) choosing a second quadrupole RF drive frequency that best optimizes the isolation of a first-generation product-ion species of interest by the quadrupole mass filter;

(f) isolating the first-generation product-ion species of interest by causing the product ions to pass through the quadrupole mass filter while the second chosen RF drive frequency is applied to the rod electrodes thereof;

(g) fragmenting or reacting the chosen first-generation product-ion species of interest, thereby generating second-generation product ions comprising a plurality of second-generation product-ion species having various second-generation product-ion m/z values; and (h) mass analyzing the second-generation product-ion species.

Optionally, the fragmentation/reaction step (c) may also include transferring a portion of the first-generation product ions to a mass analyzer for analysis, whereby the analysis is used to choose the first-generation product-ion species of interest that is subsequently isolated in step (f). In some instances, the step of returning the plurality of product-ion species back to the inlet end of the quadrupole mass filter may include passing the plurality of product-ion species, in a reverse direction, through the fragmentation or reaction cell and the quadrupole mass filter. In such instances, the product-ion species may be trapped at the inlet end of the quadrupole mass filter. In other alternative instances, the step of returning the plurality of product-ion species back to the inlet end of the quadrupole mass filter may include passing the product ions through bypass ion optics. The fragmentation/reaction cell may generate product ions by any known means, such as collision-induced dissociation, resonant excitation, electron capture dissociation (ECD), electron transfer dissociation (ETD) surface-induced dissociation (SID), proton-transfer reaction (PTR), photon based (e.g., UVPD, IRMPD) dissociation or by any reaction with reagent ions or a reagent gas.

Optionally, the mass spectrometer that is being operated may include an ion storage device that is disposed between the fragmentation cell and a mass analyzer of the mass spectrometer. In such situations, the following additional steps (c1) and (c2) may be included after the step (c) and prior to the step (d):

(c1) accumulating the plurality of first-generation product-ion species within the ion storage device; and (c2) operating an optional ion gate to prevent additional ions from entering the quadrupole mass filter;

Similarly, the following additional step (g1) may be included after the step (g) and prior to the step (h):

(g1) accumulating the plurality of second-generation product-ion species within the ion storage device;

According to a second aspect of the present teachings, a mass spectrometer system is provided, the system comprising:

an ion source;

an ion storage apparatus configured to receive and store primary ions from the ion source and to receive and store product ions generated from the primary ions;

a quadrupole mass filter configured to:

receive either the primary ions or product ions from the ion storage apparatus;

selectively isolate a subset of the primary ions or product ions received from the ion storage apparatus, whereby the isolated subset of ions has a selected mass-to-charge ratio (m/z) range, wherein an RF drive frequency that is applied to the quadrupole during the isolation depends upon the selected m/z isolation range;

transmit the isolated subset of ions to a fragmentation or reaction cell;

receive other product ions from the fragmentation or reaction cell; and transmit the other product ions received from the fragmentation or reaction cell to the ion storage apparatus; and a mass analyzer configured to receive product ions from the fragmentation or reaction cell.

According to some embodiments, an ion gate may be disposed between the ion source and the ion storage apparatus. According to some embodiments, an ion gate may be disposed between the fragmentation or reaction cell and the mass analyzer. Some embodiments may further comprise:

a second ion storage apparatus disposed between the fragmentation or reaction cell and the mass analyzer and configured to:

receive and store the product ions received from the fragmentation or reaction cell; and return the stored product ions to the fragmentation or reaction cell.

According to a third aspect of the present teachings, a mass spectrometer system is provided, the system comprising:

an ion source;

a branched ion guide configured to:

receive primary ions from the ion source; and receive product ions from a bypass ion pathway;

an ion storage apparatus configured to receive and store either the primary ions or the product ions from the branched ion guide;

a quadrupole mass filter configured to:

receive either the primary ions or product ions from the ion storage apparatus;

selectively isolate a subset of the primary ions or product ions received from the ion storage apparatus, whereby the isolated subset of ions has a selected mass-to-charge ratio (m/z) range, wherein an RF drive frequency that is applied to the quadrupole during the isolation depends upon the selected m/z isolation range;

a fragmentation or reaction cell configured to:

receive the isolated subset of the primary ions or product ions from the quadrupole mass filter; and either generate second product ions by reaction or fragmentation of the received primary ions or else generate third product ions by reaction or fragmentation of the received product ions; and a switchable branched ion guide configured to either transfer one or more of the product ions, second product ions and third product ions to the bypass ion pathway or transfer one or more of the product ions, second product ions and third product ions to a mass analyzer.

BRIEF DESCRIPTION OF THE DRAWINGS

The above noted and various other aspects of the present invention will become apparent from the following description which is given by way of example only and with reference to the accompanying drawings, not necessarily drawn to scale, in which.

DETAILED DESCRIPTION

Figure 1:
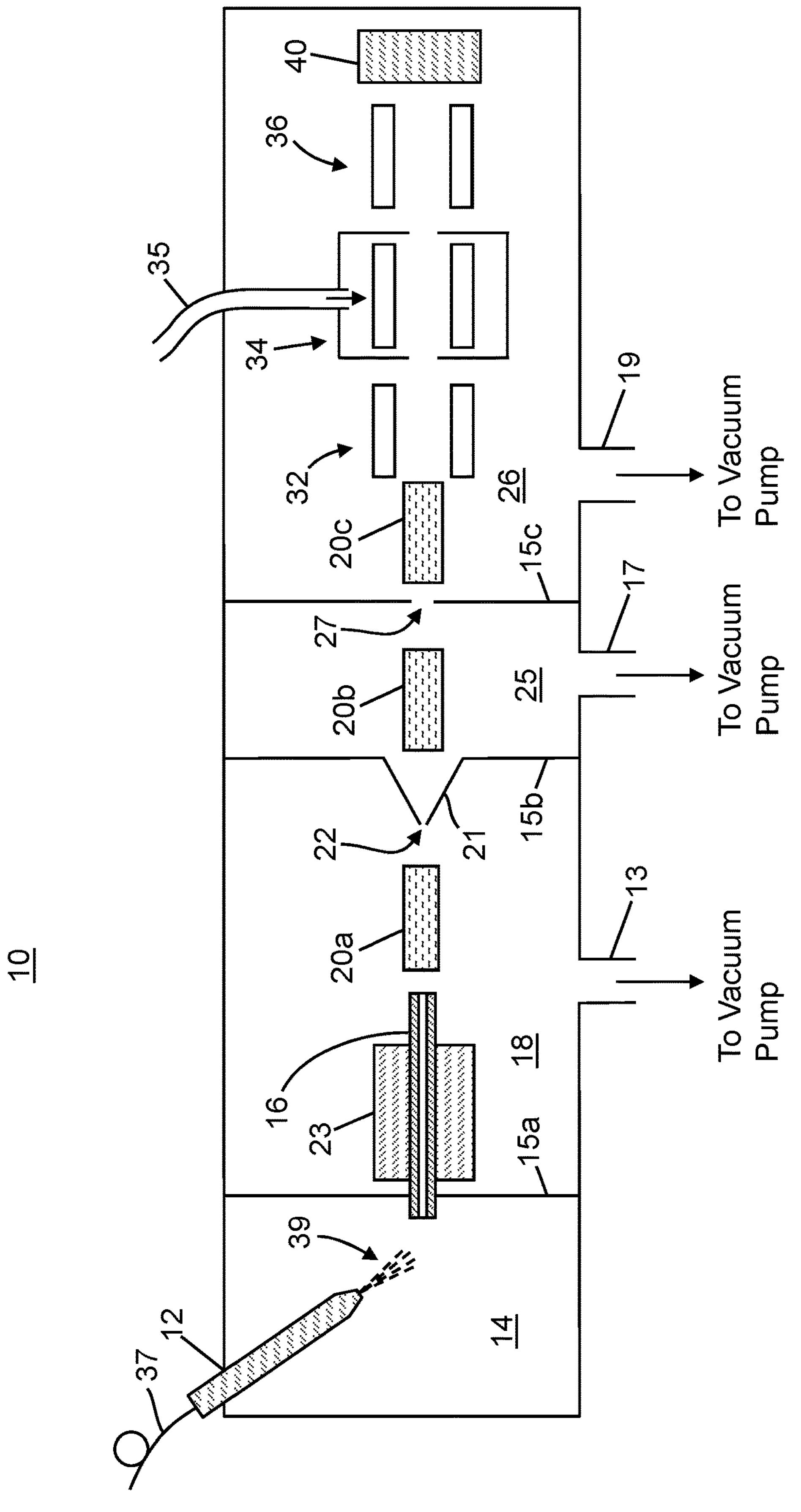
FIG. 1 is a schematic depiction of a triple-quadrupole mass spectrometer.

The following description is presented to enable any person skilled in the art to make and use the invention and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. To fully appreciate the features of the present invention in greater detail, please refer to FIGS. 1, 2A, 2B and 3A-3C in conjunction with the following description.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that, for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. Moreover, it is to be appreciated that the figures, as shown herein, are not necessarily drawn to scale, wherein some of the elements may be drawn merely for clarity of the invention. Furthermore, one skilled in the art can readily appreciate that the specific sequences in which methods are presented and performed are illustrative and it is contemplated that the sequences can be varied and still remain within the spirit and scope of the various embodiments disclosed herein. It should be noted that reference numerals may be repeated among the various figures to show corresponding or analogous elements.

Unless otherwise defined, all other technical and scientific terms used herein have the meaning commonly understood by one of ordinary skill in the art to which this invention belongs. In case of conflict, the present specification, including definitions, will control. It will be appreciated that there is an implied "about" prior to the quantitative terms mentioned in the present description, such that slight and insubstantial deviations are within the scope of the present teachings. In addition, the use of the words "comprise", "comprises", "comprising", "contain", "contains", "containing", "include", "includes", and "including" are not intended to be limiting. As used herein, "a" or "an" also may refer to "at least one" or "one or more." Also, the use of "or" is inclusive, such that the phrase "A or B" is true when "A" is true, "B" is true, or both "A" and "B" are true.

As used herein, the term "DC" (for "Direct Current") is used only for the purpose of designating a non-oscillatory voltage or non-oscillatory electrical potential applied to an electrode and does not necessarily imply the existence of a current that is carried by the movement of electrons through wires, electrodes or other conductors. The term "DC" is thus used herein to distinguish the referred-to voltage(s) from applied periodic oscillatory voltages, which themselves may be referred to as either "RF" (radio frequency) or "AC" voltages.

Typically, radio frequency (RF) signals are applied to electrodes of quadrupole apparatuses to generate electric fields that are used to manipulate ions for transport, confinement, and separation. For example, a quadrupole apparatus that is used to confine ions along a linear axis generally comprises four rod electrodes organized as two pairs of mutually parallel rod electrodes. A first pair of rod electrodes, known as X-rods, comprise rod electrodes that are diametrically opposed to one another across the axis. The remaining two rod electrodes, which are likewise diametrically opposed to one another across the axis and which are known as Y-rods, comprise the second pair of rod electrodes. In order to confine ions along the axis, a first oscillatory RF voltage waveform is applied to the X-rods and a second oscillatory RF waveform that is 180-degrees out-of-phase with the first RF waveform is applied to the Y-rods. Resonant circuits are used to efficiently generate the RF waveforms with amplitudes in the thousands of volts.

As is known, a variable DC voltage may be applied between the X-rod pair and the Y-rod pair in order to preferentially transmit ions of certain restricted ranges of m/z through the quadrupole mass filter. The resolving power of the m/z discrimination is dependent on the frequency of the applied RF waveforms. As the general m/z range of ions passing through the mass filter changes, the frequency, f, of the applied RF should also change to maintain optimal m/z resolution. The range of ion m/z values that may be transmitted through a quadrupole mass filter is determined by the maximum m/z value that may be transmitted. Austin et al. (Austin, W. E., A. E. Holme, and J. H. Leck. "The mass filter: Design and performance." In *Quadrupole mass spectrometry and its applications.* 1976) note that the maximum transmittable mass, $M_m$ is given by the simple relation;

$$M_m = \frac{7\times10^6 V_m}{f^2 r_0^2}$$

where $V_m$ cos 2πft is the RF voltage applied between adjacent rods, $r_0$ (in meters) is the inscribed radius of the rods and $M_m$, the maximum mass, is measured in amu. Austin et al. further point out that mass spectrometer resolution, R, which is dependent on the number of cycles, N, of the RF field to which ions are exposed while traversing the length of the mass filter through the relationship $$R = \frac{M}{\Delta M} \approx \frac{1}{K} N^2$$

where ΔM is the width of the peak at mass M, K is a constant and N is proportional to frequency, f. Accordingly, both the mass range and the mass resolution may be strongly dependent on RF frequency, with an increase mass range corresponding to a degradation of mass resolution and vice versa. Accordingly, an analyst must consider the trade-off between these characteristics when choosing an optimal RF frequency to be applied to a quadrupole mass filter that has the capability of being operated using a selectable variable RF frequency.

Conventionally, the change in the applied RF frequency is accomplished by changing the resonant frequency of a resonant circuit via switches in order to add or remove inductance or capacitance to the resonant circuit. The frequency of the RF power source sets the frequency of the applied RF waveforms. However, the use of switches requires the provision of unnecessary additional electrical signals to control the switch operation. Moreover, it is possible to improve the 0-factor of the circuit by eliminating the switches. As described anonymously in Research Disclosure database number 669062 (www.researchdisclosure.com; Dec. 17, 2019), a single switchless circuit can include two resonant modes having different resonant frequencies. The multi-filar switchless circuit described in Research Disclosure database number 669062, which is incorporated herein by reference, has been found suitable for use in conjunction with the herein disclosed methods and apparatuses.

Figure 2A:
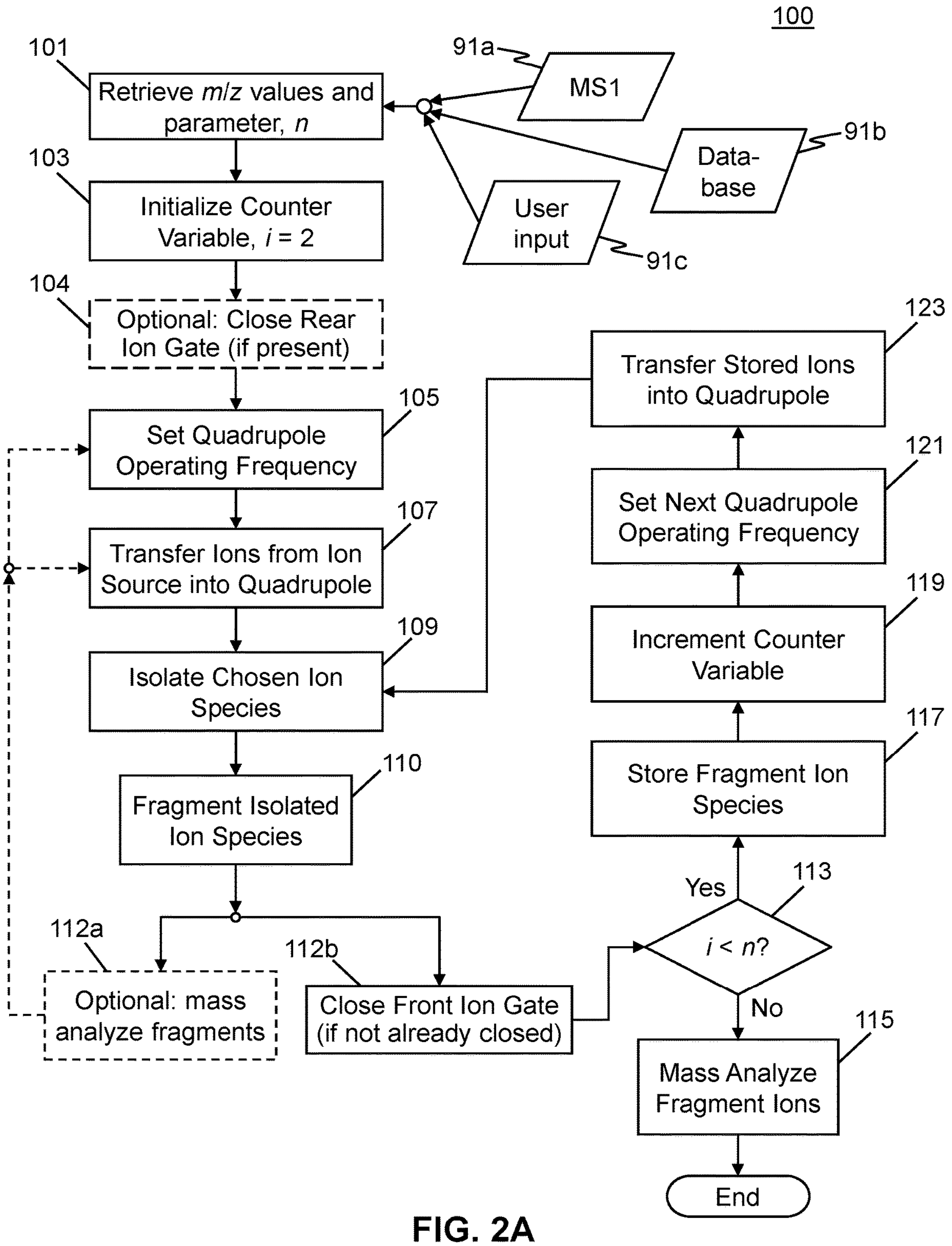
FIG. 2A is a flow diagram of a method for MSn mass spectrometry in accordance with the present teachings.
Figure 2B:
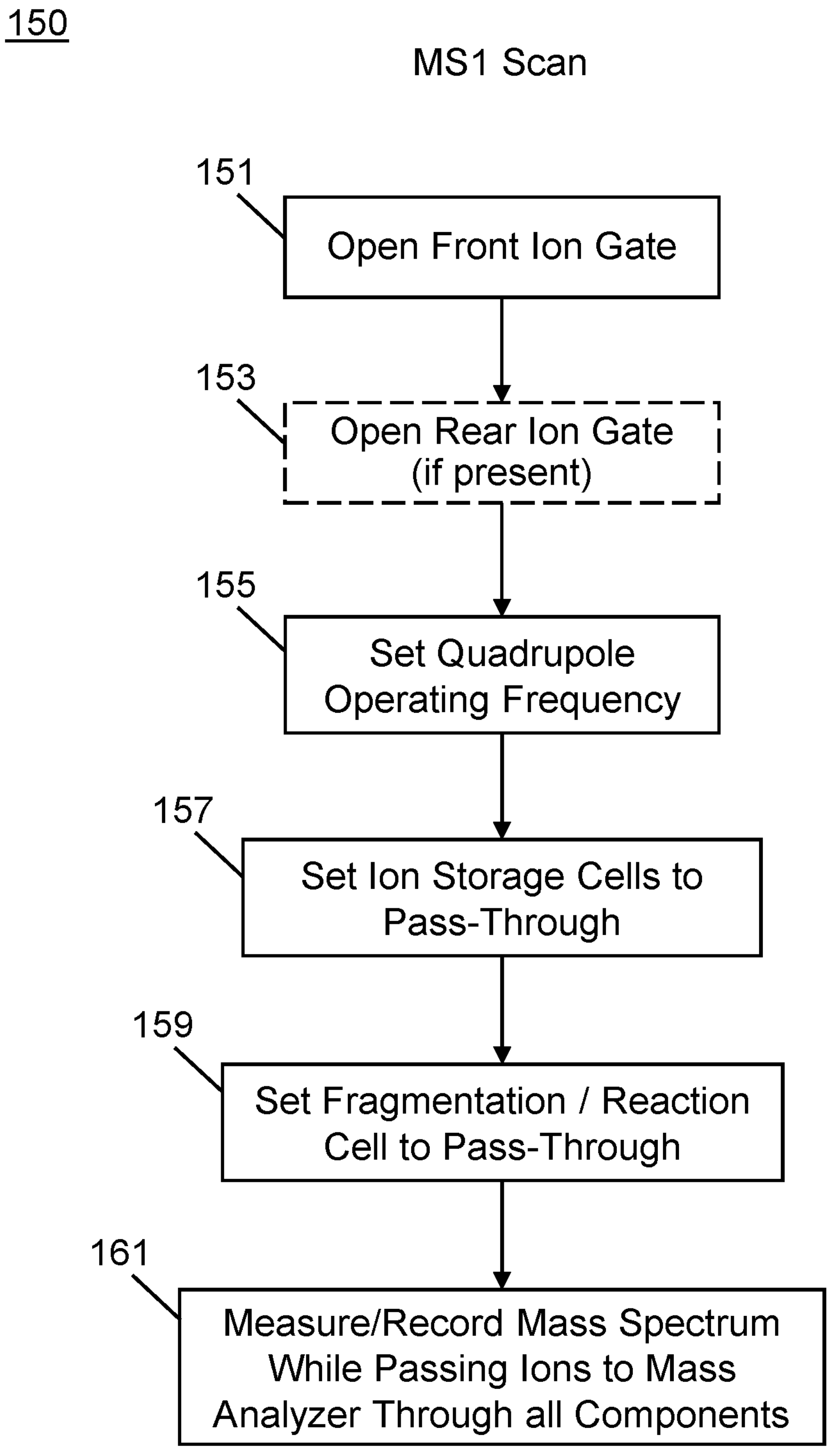
FIG. 2B is a flow diagram of a method for performing MS1 mass spectrometry analysis using an apparatus in accordance with the present teachings.

FIG. 2A is a flow diagram of a method 100, in accordance with the present teachings, of performing an MSn analysis (where "n" represents an integer that is greater than two) using a single quadrupole mass filter, a single fragmentation cell and at least one multi-filar switchless circuit as described in the aforementioned Research Disclosure database number 669062. Under some circumstances, the goal of the analysis may be to determine if a particular target compound, having known ionization behavior and known ion fragmentation or ion-ion reaction products, is present in a sample and also, if the compound is present, the concentration of the compound. In such circumstances, the m/z values of diagnostic precursor ions and the m/z values of particular diagnostic fragment ions of the targeted compound at all stages of fragmentation or either known beforehand or are chosen by an analyst. During the targeted analysis, the mass spectrometer is operated so as to isolate and fragment ion species having the known or chosen m/z values prior to the final fragmentation stage. A mass analysis is generally performed after the final fragmentation stage (i.e., the $(n-1)^{th}$ fragmentation stage) but mass analyses of precursor ions and of the product ions of intermediate stages of fragmentation are optional. The known or chosen m/z values, the parameter n and perhaps other information may be retrieved (step 101) either by direct user input 91*c* or from a database 91*b*. In some other circumstances, the method 100 may be executed as part of a so-called data-dependent acquisition or data-dependent analysis procedure in which decisions regarding which ions are to be isolated and fragmented during execution of the method 100 are made, in an automated fashion, based upon data obtained during an immediately preceding MS1 mass spectral analysis. In such instances, the m/z values and other information is retrieved (step 101) from the results of the prior MS1 analysis 91*a*, an example of which is outlined in FIG. 2B, discussed below.

Figure 3A:
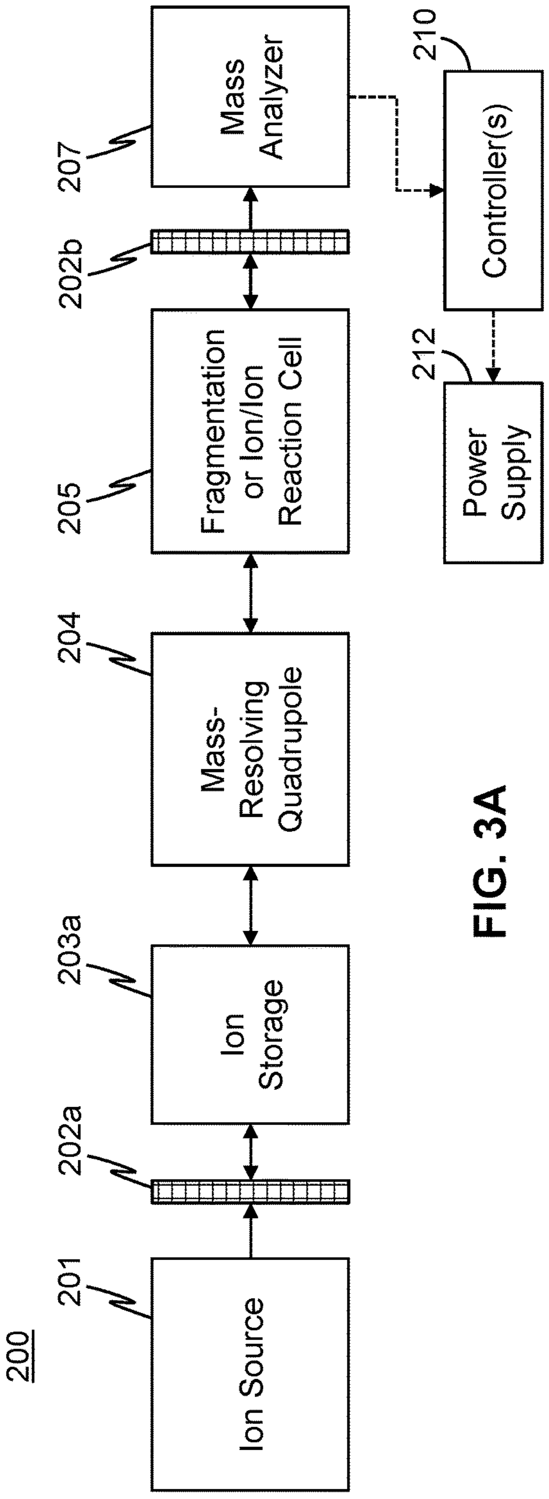
FIG. 3A is a schematic diagram of components of a first mass spectrometer system in accordance with the present teachings.
Figure 3B:
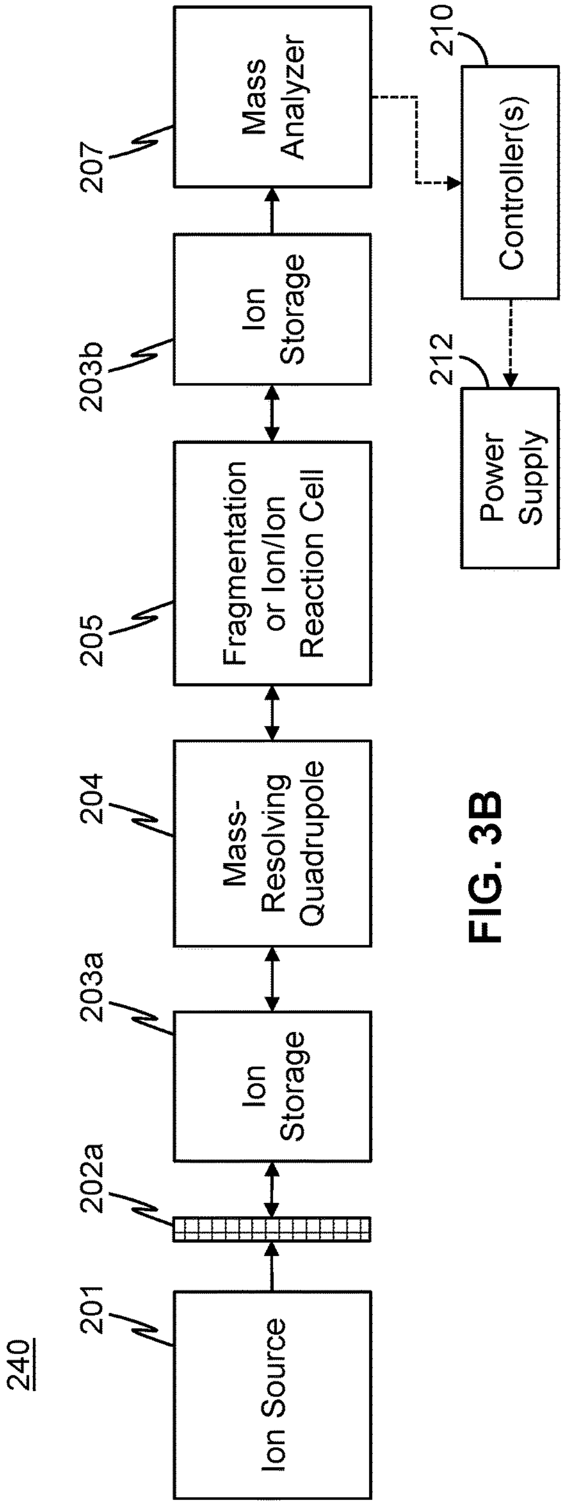
FIG. 3B is a schematic diagram of components of a second mass spectrometer system in accordance with the present teachings.
Figure 3C:
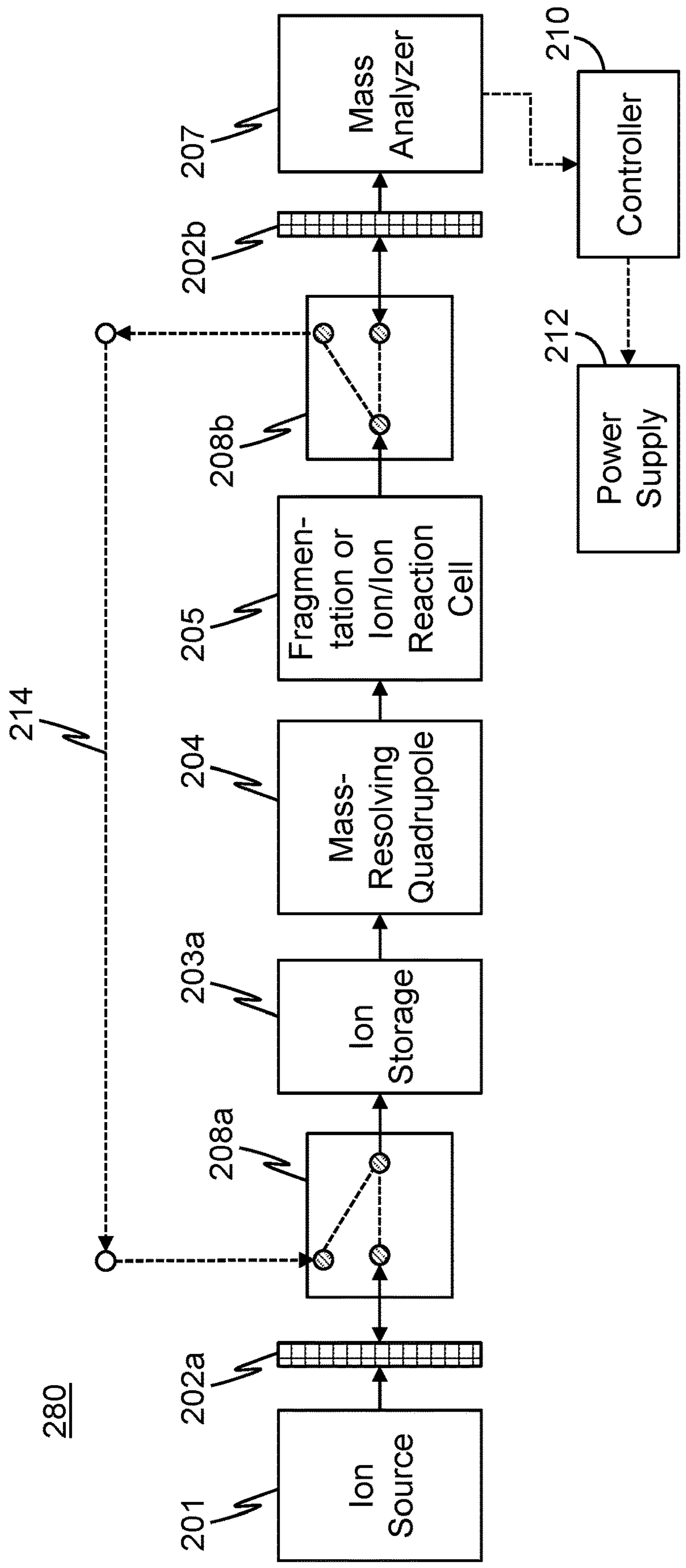
FIG. 3C is a schematic diagram of components of a third mass spectrometer system in accordance with the present teachings.

Preferably, the method 100 (FIG. 2A) is executed under the control of one or more computers and/or other logic controllers or programmable processors 210 (FIGS. 3A-3C) that comprise non-transient computer-readable instructions that are configured to cause the method to be executed. Operationally, the computer-readable instructions cause the one or more computers and/or other logic controllers or programmable processors 210 to transmit electrical or electronic signals to one or more power supplies 212 (FIGS. 3A-3C). These signals and their timing cause the one or more power supplies to provide appropriate voltages at appropriate times to various electrodes within the mass spectrometer. The magnitude and timing of the provided voltages cause the steps of the method to be executed in a desired sequence. The one or more computers and/or other logic controllers or programmable processors 210 may receive, store and digitally analyze mass spectral data provided by a detector of a mass analyzer apparatus 207.

The first step, step 101, of the method 100 (FIG. 2A) is a parameter input step in which certain parameters are either retrieved, as from a data file or database 91*b*, from manual input 91*c* that is entered by a user, or from a prior MS1 analysis 91*a*. As noted above, the parameters include a respective set of m/z values for each target analyte compound. The parameters may also include other information that relates to the target analyte compound and that is necessary to properly detect and/or quantify the target analyte compound. For example, if the mass spectrometer is fluidically coupled to and receives eluate from a chromatograph (not shown), then the parameters may include a chromatographic retention time that indicates when the target analyte may be expected to be delivered to the mass spectrometer. The m/z values of each set of m/z values pertain to ion species to be isolated and thereby selected for fragmentation during the course of the analysis. A first m/z value of each set pertains to isolation of precursor ions as generated by and as received from an ion source. The remaining m/z values pertain to fragment ions that are to be themselves isolated and thereby selected for further fragmentation. Each set of m/z values consists of a variable number, n, of individual m/z values. The parameter, n, pertains to the degree of fragmentation required (i.e., for an MS4 analysis, n=4). The parameter n is greater, by one, than the number of fragmentation stages to be executed (i.e., for an MS4 analysis, three stages of fragmentation are required, since an analysis of original precursor ions corresponds to MS1).

In step 103 of the method 100, and a counting variable, i, is initialized. The counting variable, i, is compared to the parameter, n, in step 113 and, if i<n in step 113, then execution of the method 100 branches to step 117 in which fragment ions from a preceding stage are stored and then to step 119 in which the counter variable, i, is incremented. Otherwise, if it is found that i=n in step 113, then the required number of fragmentation stages have been executed and execution branches to step 115 in which a mass analysis of the ultimate product ions is performed.

In step 104, which is optional, a rear ion gate that is disposed upstream from an inlet to a mass analyzer (e.g., rear ion gate 202*b* which is upstream from mass analyzer 207 as shown in FIG. 3A and FIG. 3C) may be closed in order to prevent intermediate-stage product ions from being inlet to the mass analyzer. Depending upon experimental requirements and/or user preferences, the execution of the method 100 may include a mass analysis, in step 115, of the finally-produced product ions that are generated after n−1 stages of fragmentation. In such instances, the rear ion gate may remain closed until just prior to the mass analysis in order to retain as many intermediate product ions as possible prior to the execution of step 115. Otherwise, if one or more mass analyses of intermediate-stage product ions are desired, the rear ion gate may be opened, during one or more of the iterations of step 110, to admit ions into the mass analyzer as part of an optional step 112*a* of mass analysis of intermediate-stage product ions. Since any such mass analysis 112*a* of intermediate-stage ions destroys those ions, one or more additional iterations of steps 105-110 or of steps 107-110, as indicated by the dashed arrow in FIG. 2A, may be required to replace those ions so that a subsequent stage of fragmentation may be performed.

In step 105 of the method 100, an RF operating frequency—also known as a drive frequency—is chosen, from among two or more possible operating frequencies that are available using the one or more switchless circuits described above. The step 105 also includes applying the chosen operating frequency to the rod electrode of the single quadrupole mass filter, such as the single quadrupole mass filter 204 that is depicted in each of the mass spectrometer systems 200 (FIG. 3A), 240 (FIG. 3B) and 280 (FIG. 3C). The particular RF operating frequency that is chosen in step 105 is the frequency that best optimizes the resolution and/or transmission of the quadrupole mass filter at the m/z value of the known or chosen precursor ion of the particular targeted compound. At the same time, an appropriate resolving DC voltage is chosen and applied between X- and Y-rods of the quadrupole mass filter.

With the chosen operating frequency and appropriate resolving DC voltage being applied to the quadrupole electrodes, ions from an ion source, such as the ion source 201 shown in FIGS. 3A-3C, are transferred into the quadrupole mass filter in step 107. As is known, the resolving DC voltage is chosen so as cause the mass filter to transmit, at the particular applied RF operating frequency and voltage, only ions within an m/z range about the known or chosen precursor m/z value. All other ions that are not within this narrow range are ejected from the quadrupole mass filter before they can completely traverse the length of the mass filter. This process of transmitting only a desired m/z range, which corresponds to step 109 of the method 100, is known as isolation of the precursor ions. In step 112*b*, an ion gate that is disposed between the ion source and the quadrupole mass filter is closed so as to prevent any further ions from the ion source from entering downstream mass spectrometer components while subsequent steps of the method 100 are being executed. Such an ion gate, which is here referred to as a front ion gate in order to distinguish it from other possible ion gates, is shown as front ion gate 202*a* in FIGS. 3A-3C.

The precursor ions that are isolated in step 109 of the method 100 (FIG. 2A) are transferred to the single fragmentation cell and fragmented or otherwise reacted therein so as to produce a first generation of product ions in step 110. Note that, the relative order of execution of steps 110, 112*b*, 113 and 117 of the method 100 can change based on the general type category of fragmentation or reaction that is employed. Operationally, two general categories of fragmentation or reaction may be defined, viz. a first category in which fragmentation or other reaction is conducted while the ions are trapped in a storage cell (herein referred to as "non-flow-through" fragmentation or reaction) and a second category in which fragmentation or reaction that takes place as the ions traverse a cell (herein referred to as "flow-through" fragmentation or reaction). Non-flow-through fragmentation/reaction includes ultraviolet photo-dissociation (UVPD), electron-transfer dissociation (ETD) and proton transfer reaction (PTR) and can include, in some circumstances, electron capture dissociation (ECD), infrared multiple photon dissociation (IRMPD), beam-type collisional dissociation and resonance excitation collisional dissociation. Flow-through fragmentation can include, without limitation, beam-type collisional dissociation and ECD types.

When using one of the flow-through methods of fragmentation or reaction, the energy required for fragmentation is provided either by an external source (e.g., a laser) or, in the case of beam-type collisional dissociation, by the kinetic energy of precursor ions as they are introduced into an inlet end of the fragmentation cell as a collimated "beam". As soon as product ions are generated by fragmentation or reaction within the cell, these same ions are caused to migrate towards and through an outlet end of the fragmentation cell, either as a result of their residual kinetic energy or else under the influence of an internal electric field within the fragmentation cell. The product ions may be stored within a separate ion storage device (e.g., ion storage apparatus 203*b* shown in FIG. 3B. Under this type of operation, step 112*b* may not be executed until the completion of execution of step 117 since a front ion gate, if present, must remain open to permit a beam of precursor ions to continually flow from an ion source through a mass filter apparatus into a fragmentation or reaction cell.

When employing one of the non-flow-through methods of fragmentation, the precursor ions are either trapped within the cell together with reactive reagent ions or otherwise activated while trapped within the fragmentation or reaction cell. Once generated, the fragment ions may be temporarily accumulated and stored within the fragmentation/reaction cell (e.g., step 117 of the method 100) instead of within a separate storage apparatus. Thus, when non-flow-through fragmentation is employed, execution of the ion gate closing step 112*b* may occur prior to or during the execution of the fragmentation step 110 and execution of the fragment-ion storage step 117 may occur subsequent to or during the execution of the fragmentation step 110.

Once generated, the first-generation product ions are then temporarily stored in step 117 in preparation for being returned to the quadrupole mass analyzer for isolation of a subset of the first-generation ion species and subsequent further fragmentation of the ions of that isolated subset. An optional ion storage cell that is downstream from the fragmentation cell, such as the ion storage cell 203*b* that is downstream from a fragmentation cell or reaction cell 205 shown in FIG. 3B, may be employed for the temporary storage of the first-generation product ions. Such storage configuration may be suitable when fragment ions are generated by one of the flow-through fragmentation methods, as discussed above.

Alternatively, the fragmentation or reaction cell 205 may itself be used for temporary storage of the first-generation product ions. This alternative storage procedure may by suitable when the product ions are fragment ions that are generated by one of the non-flow-through fragmentation methods. In this alternative storage configuration, a rear ion gate, such as the rear ion gate 202*b* that is illustrated in FIG. 3A, may be set in a "closed" configuration to retain recently-produced fragment ions within the fragmentation cell.

According to a further alternative ion storage configuration, an ion storage cell, such as ion storage cell 203*a* (FIGS. 3A-3C), that is upstream from the fragmentation cell may be employed for the temporary storage of fragment ions. In order to transfer the ions to the upstream storage cell, a reverse electrical potential gradient may be set up along the general ion pathway between the fragmentation/reaction cell 205 and an upstream ion storage cell 203*a*. The reverse electrical potential gradient may be created by applying appropriate offset voltages to each of the fragmentation/reaction cell 205, the quadrupole mass filter 204, and the upstream ion storage cell 203*a* (e.g., see FIG. 3A) as well as to any intervening ion guides or ion lenses (not shown) that are disposed between these components. The reverse electrical potential gradient causes fragment ions to be transferred, in a reverse direction, through the fragmentation cell and the quadrupole mass filter to the upstream storage cell. Accordingly, double-headed arrows between components of FIGS. 3A-3C are used to indicate optional bi-directional transfer of ions. During an upstream transfer of ions, the fragmentation and filtering operations of the fragmentation cell and mass filter, respectively, are not operative. An appropriate electrical potential may be applied to an ion lens (not shown) on the upstream end of the ion storage cell or to the front ion gate 202*a* to prevent further upstream transfer of ions and/or to prevent ions from the ion source from entering the ion storage cell.

As an alternative to transferring product ions in a reverse direction through a fragmentation cell and a quadrupole mass filter, a bypass ion path (e.g., bypass ion path 214 as shown in FIG. 3C) may instead by employed for the upstream transfer to an ion storage cell (e.g., ion storage cell 203*a*). FIG. 3C illustrates one example of a configuration that employs a bypass ion path. The configuration of FIG. 3C employs a back-end ion-pathway-branching device, such as an ion switch 208*b*, to shunt the product ions onto the bypass ion path 214. Another front-end ion-pathway-branching device 208*a*, which may be another ion switch, is disposed adjacent to the upstream end of the ion storage cell 203*a*. If present, the front-end ion-pathway-branching device 208*a* may be employed to deliver the ions from the bypass path 214 to the ion storage apparatus. Switchable branched ion guides are described in U.S. Pat. Nos. 7,459,678, 7,829,850 and 7,952,070, all of which are hereby incorporated by reference herein. The system configuration illustrated in FIG. 3C may also incorporate curved ion guides. Examples of suitable curved ion guides are described in U.S. Pat. Nos. 8,084,750, 8,461,524, 9,123,518 and 9,543,136, all of which are hereby incorporated by reference herein. Additionally, U.S. Pat. No. 7,932,487, which is hereby incorporated by reference herein, describes a looped ion pathway that employs curved ion guides. The types of switches, branched ion guides and switchable branched ion guides that be employed are not limited to those that are taught in the above-cited references. More generally, any suitable ion-pathway switching system and/or ion guiding system may be employed such as, for example, ion switches and ion guiding systems that are fabricated using printed circuit board technology including Structures for Lossless Ion Manipulations (SLIM) technology [Webb, Ian K., Sandilya VB Garimella, Aleksey V. Tolmachev, Tsung-Chi Chen, Xinyu Zhang, Randolph V. Norheim, Spencer A. Prost et al. "Experimental evaluation and optimization of structures for lossless ion manipulations for ion mobility spectrometry with time-of-flight mass spectrometry." *Analytical chemistry* 86, no. 18 (2014): 9169-9176. Also see Ibrahim, Yehia M., Ahmed M. Hamid, Liulin Deng, Sandilya VB Garimella, Ian K. Webb, Erin S. Baker, and Richard D. Smith. "New frontiers for mass spectrometry based upon structures for lossless ion manipulations." *Analyst* 142, no. 7 (2017): 1010-1021.].

In general, the first-generation product ions comprise multiple ion species having various respective m/z values. Once these product ions have been produced and temporarily stored, they are transferred back to the quadrupole mass analyzer (step 123, FIG. 2A) in preparation for isolation of a subset of the first-generation product ion species comprising a different m/z range of interest (step 109) and for further fragmentation of the isolated first-generation fragment ions (step 110). Accordingly, it may readily be seen that the steps 109, 110, 112*b*, 113, 117, 119, 121 and 123 comprise an iterated loop of steps that is repeatedly executed, with each execution of the loop corresponding to production of a successive generation of product ions. Note, however, that it is generally not necessary to execute the step 112*b* after the second and subsequent executions of the step 109.

The repeated execution of the loop of steps continues until it is determined, in step 113, that the counter variable, i, is equal to n. Once it is determined, in step 113, that i=n, execution of the method 100 branches out of the loop of steps and proceeds to step 115, in which a rear ion gate (e.g., rear ion gate 202*b* in FIG. 3A and FIG. 3C) is opened, if necessary, to admit the finally produced product ions into a mass analyzer (e.g., mass analyzer 207, FIGS. 3A-3C) and a mass analysis of those ions is carried out. The results of the mass analysis comprise an MSn mass spectrum (where "n" represents an integer that is greater than two) that is generated by a series of n−1 repeated stages of ion m/z selection, ion isolation, and fragmentation of the so-selected ions.

Generally, the m/z values of ions that are isolated in step 109 of the method 100 vary between each iteration of the loop of steps (comprising steps 109, 110, 112*b*, 113, 117, 119, 121 and 123). In general, the mass, $m_f$, of any fragment ion species at any stage of fragmentation is expected be less than the mass, $m_p$, of the parent ion species that was fragmented to produce the fragment ion species. Nonetheless, because ions having a range of charge states may be generated at any stage of fragmentation, the m/z value of an ion species that is chosen to be isolated at the $j^{th}$ stage of isolation may be either less than or greater than the m/z value of an ion species that is chosen to be isolated at the $(j+1)^{th}$ or $(j-1)^{th}$ stage of isolation. In many instances, the difference in the m/z values of ions that are isolated in different stages may be sufficiently great to justify changing the frequency of RF voltage waveforms that are applied to the electrodes of a quadrupole mass filter between consecutive stages of isolation. Accordingly, the method includes a step 121, which is executed prior to each ion isolation event (step 109), in which a determination is made regarding which available RF frequency best optimizes the efficiency of isolation of the ion species that is to be isolated in the immediately following execution of step 109. Preferably, the power supply (e.g., power supply 212 shown in FIGS. 3A-3C) that provides the RF voltage waveforms to the quadrupole mass filter comprises at least one multi-filar switchless dual-resonance circuit as described in Research Disclosure database number 669062. A single instance of such a circuit provides a choice between two available RF frequencies that may be provided to the quadrupole mass filter. The circuit may be expanded to provide a choice between three or more frequencies by addition of successive LC stages to the circuit, such that the number of available RF frequencies scales with the number of LC nodes (i.e., three nodes yields three frequencies). Thus, at each execution of the step 121, a determination is made as to which of the available RF frequencies best optimizes the isolation to be performed during the following execution of the isolation step 109. If the determination finds that the RF frequency that is to be applied is different from the RF frequency that was applied during the immediately preceding execution of step 109, then the new frequency is set and applied to the quadrupole mass filter in step 121.

In step 123 of the method 100 (FIG. 2A), intermediate-stage product ions previously generated within the fragmentation/reaction cell 205 are transferred back to the ion storage apparatus 203*a*. The transfer operation may be performed by one of two different transfer methods. According to a first transfer method, the intermediate-stage product ions are transferred, in a reverse or upstream direction, through the same mass spectrometer components that were previously employed to generate the intermediate stage product ions by selection and isolation of precursor ions and fragmentation or other reaction of those precursor ions. If, immediately after their generation, the intermediate-stage fragment ions are stored within an ion storage apparatus 203*b* (FIG. 3B) that is downstream from the fragmentation/reaction cell 205, then the upstream transfer of those ions according to the first transfer method includes the sub-steps of:

- transferring the stored intermediate-stage product ions from the ion storage apparatus 203*b* back to the fragmentation/reaction cell 205;
- transferring the intermediate-stage product ions in a reverse direction through the fragmentation/reaction cell 205 in the absence of any fragmentation or reaction;
- transferring the intermediate-stage product ions in a reverse direction from the fragmentation/reaction cell to the mass-resolving quadrupole 204;
- transferring the intermediate-stage product ions in a reverse direction through the mass-resolving quadrupole 204 in the absence of any filtering of ions; and
- transferring the intermediate-stage product ions in a reverse direction from the mass-resolving quadrupole 204 to the ion storage apparatus 203*a*.

The first such sub-step is eliminated if, instead of having been stored within an ion storage apparatus that is downstream from the fragmentation/reaction cell, the ions have been stored within the fragmentation cell.

The reverse transfer is accomplished by reversing the normal polarities of DC voltages applied to electrodes of the various components through which the ions are transferred such that ions lose potential energy during the reverse transfer. For example, during a normal mass analysis of positively charged ions, the ions are urged in the forward (downstream) direction by an overall electrical potential decrease in the same direction. However, during the reverse transfer of the intermediate-stage product ions (assumed to be positively charged), the reversed polarities produce an overall decrease in electrical potential in the upstream direction. Any potential fragmentation or reaction within the fragmentation/reaction cell is eliminated during the reverse transfer either by temporarily reducing a pressure of a collision gas or a reagent gas within the cell or by ensuring that the kinetic energy provided to the ions is less than a threshold activation energy for fragmentation or reaction. Mass filtering within the mass-resolving quadrupole is prevented during the reverse transfer by refraining from applying a DC resolving potential to the electrodes of that apparatus.

As noted above, the method 100 (FIG. 2A) of MSn analysis of a sample may retrieve data 91*a* that is derived from a preceding MS1 analysis of the same sample. The method 150 that is provided in FIG. 2B outlines how such an MS1 analysis may be performed using one of the mass spectrometer systems 200 (FIG. 3A), 240 (FIG. 3B and 280 (FIG. 3C). In step 151 of the method 150, the front ion gate 202*a* is opened, if necessary, so as to permit ions from the ion source to pass through to downstream mass spectrometer components. Likewise, in step 153, the rear ion gate 202*b* is opened, if present and if necessary, to permit ions to pass through to the mass analyzer 207. In step 155, the operating frequency of the mass-resolving quadrupole 204 is set to an appropriate value based on the m/z range of expected sample-derived ions. In step 157, the ion storage cell 203*a* and, if present, the ion storage cell 203*b* are configured to allow ions to pass through without being stored therein. Similarly, in step 159, the ion fragmentation or reaction cell 205 is configured to allow ions to pass through without being stored, fragmented or otherwise modified therein. Finally, in step 161, the mass analyzer 207 is operated so as to collect and record a mass spectrum while ions are transmitted from the ion source to the mass analyzer through all upstream components. After completion of the step 161 of the method 150 (FIG. 2B), the method 100 (FIG. 1A) may be executed, with the first step 101 of that method being the retrieval of m/z values of ions to be isolated and fragmented, based on the MS1 data 91*a* derived from the mass spectrum recorded in step 161.

FIGS. 3A-3C are schematic diagrams of components of mass spectrometer systems 200, 240 and 280 that are in accordance with the present teachings and that are configured to perform MSn mass analyses using only a single mass-resolving quadrupole apparatus. In each of FIG. 3A through FIG. 3C, single-headed arrows represent ion pathways between components within which ions can move only in a single indicated direction and double-headed arrows represent ion pathways within which ions may sometimes move in a "downstream" direction (i.e., from left to right) and may sometimes move in an opposite "upstream" direction. Each illustrated mass spectrometer system comprises an ion source 201 which may comprise any type of ion source. For example, the ion source 201 may comprise any known type of atmospheric pressure ion source, such as an electrospray ion source, a heated electrospray ion source, a thermospray ion source, a paper spray ion source, an atmospheric pressure chemical ionization source, a matrix-assisted laser desorption ionization ion source, an atmospheric pressure photoionization ion source, etc. Also, the ion source may be of any type in which ionization occurs at non-atmospheric pressure, such as an electron ionization ion source, etc. Each illustrated mass spectrometer system also comprises an ion gate 202*a* which be employed to temporarily prevent ions from the ion source from reaching downstream mass spectrometer components and/or to prevent ions that are being manipulated within the mass spectrometer system from flowing back to the ion source.

Each of the mass spectrometer systems 200, (FIG. 3A) 240 (FIG. 3B) and 280 (FIG. 3C) further comprises an ion storage apparatus 203*a*, a mass resolving quadrupole 204, an ion fragmentation or ion/ion reaction cell 205, a mass analyzer 207 as well as a vacuum pumping system (not shown in FIGS. 3A-3C) that evacuates chambers that house the various illustrated components. Various ion flow control electrodes (not shown) are configured to direct ions in, in a switchable fashion, either in an upstream direction or a downstream direction between these apparatuses, as indicated by double-headed directional arrows in the depiction of the mass spectrometer system 200 (FIG. 3A) and the mass spectrometer system 240 (FIG. 3B). Such ion flow control electrodes may be either incorporated into or included between the ion storage apparatus 203*a*, mass resolving quadrupole 204, and fragmentation or ion/ion reaction cell 205. Accordingly, in the mass spectrometer system 200 and the mass spectrometer system 240, ions may enter into and flow through each of the ion storage apparatus 203*a*, the mass resolving quadrupole 204, and fragmentation/reaction cell 205 along either an upstream-directed pathway or a downstream-directed pathway.

In contrast, in operation the mass spectrometer system 280 (FIG. 3C), ions only flow into and through the ion storage apparatus 203*a*, mass resolving quadrupole 204, and fragmentation/reaction cell 205 in a conventional downstream direction. In operation of this system (FIG. 3C), ions flow only along a first ion pathway from the ion source 201 to the ion storage apparatus 203*a*, from the ion storage apparatus 203*a* to the mass resolving quadrupole 204 and from the mass resolving quadrupole 204 to the fragmentation/reaction cell 205. The product ions that are formed in the fragmentation/reaction cell are returned to the ion storage apparatus 203*a* and the mass resolving quadrupole 204 for further processing along a second ion pathway 214 that is directed upstream and that therefore bypasses the apparatuses 203*a*, 204 and 205. The transfer of ions from the first ion pathway to the bypass ion pathway 214 and from the bypass ion pathway back to the first ion pathway may be facilitated by first and second ion-pathway-branching devices 208*a*, 208*b* that are disposed upstream from the ion storage apparatus 203*a* and downstream from the fragmentation/reaction cell 205, respectively. As noted above, branching or switching of ion flow between two or more possible output pathways is known in the art. For example, switchable branched ion guides that may be used for this purpose are described in U.S. Pat. Nos. 7,459,678, 7,829,850 and 7,952,070. When employed in a reverse sense, such apparatuses may be used to direct ions from a single ion supply pathway, as selected from two or more potential ion supply pathways, to a single ion output pathway.

When ions are initially delivered from the ion source 201 to the ion storage apparatus 203*a*, the first ion-pathway-branching device 208*a* permits the ions to flow along the first ion pathway described above. In many system configurations, the first ion ion-pathway-branching device 208*a* may be a passive device that simply permits transfer of ions received from either the ion source 201 or the bypass ion pathway 214 to proceed to the ion storage apparatus 203*a*. In other, alternative system configurations, the first ion-pathway-branching device 208*a* may be an ion switch having selectable first and second switch configurations. In operation of such an apparatus, a first switch configuration permits only ions from the ion source 201 to proceed into the ion storage apparatus 203*a* and a second switch configuration permits only ions from the bypass ion pathway 214 to proceed into the ion storage apparatus 203*a*.

In operation of the mass spectrometer system 280, the second ion-pathway-branching device 208*b* is operated so as to shunt intermediate-stage product ions that are generated within the fragmentation/reaction cell 205 to the bypass ion pathway 214. Preferably, the second ion-pathway-branching device 208*b* is an ion switch that is operable, under the control of controller 210, to selectively transfer product ions either to the bypass ion pathway 214 for further processing or to the mass analyzer 207 for analysis. Intermediate stage product ions that are shunted to the bypass ion pathway are subsequently transferred to an inlet end of the ion storage apparatus 203*a* so as to be accumulated therein. The accumulated intermediate-stage product ions are then passed through the mass-resolving quadrupole 204 in order to select and isolate a subset of the intermediate-stage product ions (step 109 of the method 100 shown in FIG. 2A) for further fragmentation or other reaction within the fragmentation/reaction cell 205. During the passage of the intermediate-stage product ions through the mass-resolving quadrupole 204, the RF drive frequency that is applied to the quadrupole electrodes of that apparatus is as set in the immediately preceding execution of the step 121 of the method 100 (FIG. 2A). Operationally, the step frequency-setting step 121 includes the communication of a signal from the one or more controller or computer devices 210 to the one or more power supplies 212 that causes the one or more power supplies to adjust the RF drive frequency appropriately.

Additional ion flow control electrodes are provided in the mass spectrometer systems 200, 240, 280 (FIGS. 3A-3C) to direct ions, at one or more stages of fragmentation or reaction stages, to the mass analyzer 207. In the exemplary systems 200 (FIG. 3A) and 280 (FIG. 3C), a second ion gate 202*b* may be disposed upstream from the mass analyzer 207. When present, the second ion gate 202*b* is controllably operable (under control of the controller(s) 210) to allow ions into the mass analyzer for analysis at appropriate times during the processing of ions and to prevent ions from entering the mass analyzer otherwise. In the system 280 (FIG. 3C), the presence of the second ion-pathway-branching device 208*b* may perform the function of and obviate the need for the second ion gate 202*b*. In the exemplary system 240 (FIG. 3B), the control of the delivery of ions into the mass analyzer may be provided by a second ion storage apparatus 203*b* that is configurable to release accumulated ions out of storage and to the mass analyzer at appropriate times.

Each of the ion storage apparatuses 203*a*, 203*b* within the mass spectrometer systems 200, 240 and 280 comprises an ion trap, which is generally a multipole device, that is employed to temporarily store intermediate-stage-fragmentation or intermediate-stage-reaction product ions in preparation for at least one subsequent stage of further ion fragmentation or ion/ion reaction that is performed in the ion fragmentation or ion/ion reaction cell 205. The mass-resolving quadrupole 204, which is preferably a quadrupole mass filter comprising four rod electrodes, is employed to transmit only a selected subset of ions that are introduced into the mass filter, wherein the selected subset of ions comprises a selected sub-range of the m/z values of the introduced ions. The selected sub-range of the m/z values is generally centered about a particular m/z value of a particular ion species that is chosen for fragmentation. In this way, the selected ions are isolated from other ions that are not of analytical interest. These selected ions are transmitted from the resolving quadrupole 204 to the ion fragmentation or ion/ion reaction cell 205.

The ion fragmentation or ion/ion reaction cell 205 within the mass spectrometer systems 200, 240 and 280 may comprise any known type of fragmentation or reaction cell. For example, the cell 205 may be configured to cause ion fragmentation by so-called beam-type collision-induced dissociation in which ions are fragmented by introduction into a gas within the cell at a controlled kinetic energy. Alternatively, the cell 205 may configured to cause ion fragmentation by resonance excitation collision-induced dissociation in which the energy required for fragmentation is provided by application of supplementary AC voltage waveforms to electrodes of the cell after the ions have been introduced into the cell. A gas introduction tube (not shown) may be fluidically coupled between the cell 205 and a source of inert collision gas (not shown) if ions are fragmented by collision-induced dissociation. Alternatively, the cell 205 may comprise an ion/ion reaction cell in which sample-derived ions are reacted with reagent ions within the cell to generate reaction-product ions. In such instances, an additional ion source (not shown) may be provided for the purpose of generating the reagent ions and additional ion optical components (not shown) may be provided for the purpose of introducing the reagent ions into the cell 205.

The mass analyzer 207 may comprise any suitable type of mass analyzer, such as a second quadrupole mass filter, a three-dimensional ion trap, a linear quadrupole ion trap, an electrostatic trap mass analyzer, or a time-of-flight mass analyzer. The mass analyzer generates mass spectral data that is delivered to one or more controller or computer devices 210 that either analyze the data and/or store the data in computer-readable electronic memory. The one or more controller or computer devices 210 also comprise control electronics that are electronically coupled to one or more power supplies 212 that are electrically coupled to electrodes of the various hardware components of the systems 200, 240 and 280.

Signals that are sent from the one or more controller or computer devices 210 to the one or more power supplies 212 control the timing and magnitude of various voltages that are applied to electrodes of the mass spectrometer system hardware components. The application of voltages to the electrodes controls the various mass spectrometer operations such as: generating ions, focusing ions onto a beam path, transferring ions from one component to another in a particular direction, storing ions, fragmenting or reacting ions, switching ions from one path to another and mass analyzing ions.

The discussion included in this application is intended to serve as a basic description. The present invention is not intended to be limited in scope by the specific embodiments described herein, which are intended as single illustrations of individual aspects of the invention. Functionally equivalent methods and components are within the scope of the invention. Various other modifications of the invention, in addition to those shown and described herein will become apparent to those skilled in the art from the foregoing description and accompanying drawings.

What is claimed is:

1. A method of operating a mass spectrometer comprising:

(a) choosing one of a pair of quadrupole RF drive frequencies that best optimizes isolation of a precursor ion species of interest by a quadrupole mass filter;

(b) isolating the precursor ion species of interest by causing ions from an ion source to pass through the quadrupole mass filter while the chosen RF drive frequency is applied to the rod electrodes thereof;

(c) fragmenting or reacting the precursor ion species using an ion fragmentation or reaction cell, thereby generating product ions comprising a plurality of first-generation product-ion species having various product-ion m/z values;

(d) returning the plurality of first-generation product-ion species back to an inlet end of the quadrupole mass filter;

(e) isolating the first-generation product-ion species of interest by causing the product ions to pass through the quadrupole mass filter while the other one of the pair of quadrupole RF drive frequencies is applied to the rod electrodes thereof;

(f) fragmenting or reacting the chosen first-generation product-ion species of interest, thereby generating second-generation product ions comprising a plurality of second-generation product-ion species having various second-generation product-ion m/z values; and (g) mass analyzing the second-generation product-ion species.

2. A method of operating a mass spectrometer as recited in claim 1, wherein the step (d) of returning the plurality of first-generation product-ion species back to an inlet end of the quadrupole mass filter comprises transporting the plurality of first-generation product-ion species through the quadrupole mass filter in a reverse direction from an outlet end of the quadrupole mass filter to the inlet end of the quadrupole mass filter.

3. A method of operating a mass spectrometer as recited in claim 2, wherein the step (d) of returning the plurality of first-generation product-ion species back to an inlet end of the quadrupole mass filter further comprises transporting the plurality of first-generation product-ion species in a reverse direction from an outlet end of the ion fragmentation or reaction cell to an inlet end of the ion fragmentation or reaction cell.

4. A method of operating a mass spectrometer as recited in claim 3, wherein the step (d) of returning the plurality of first-generation product-ion species back to an inlet end of the quadrupole mass filter further comprises transporting the plurality of first-generation product-ion species to an ion storage device that is disposed between the ion source and the quadrupole mass filter.

5. A method of operating a mass spectrometer as recited in claim 1, wherein the step (d) of returning the plurality of first-generation product-ion species back to an inlet end of the quadrupole mass filter comprises:

transporting the plurality of first-generation product-ion species from an outlet end of the ion fragmentation or reaction cell to a bypass ion pathway by means of a first ion switch; and transporting the plurality of first-generation product-ion species from the bypass ion pathway to an ion storage apparatus by means of a second ion switch.

6. A method of operating a mass spectrometer as recited in claim 1, further comprising;

prior to the step (d) of returning the plurality of first-generation product-ion species back to an inlet end of the quadrupole mass filter, configuring an ion gate so as to prevent ions from the ion source from entering the quadrupole mass filter.

7. A mass spectrometer system comprising:

an ion source;

an ion storage apparatus configured to receive and store primary ions from the ion source and to receive and store product ions generated from the primary ions;

a quadrupole mass filter configured to receive either the primary ions or product ions from the ion storage apparatus;

an ion fragmentation or reaction cell configured to receive at least a portion of the primary ions or a portion of the product ions from the quadrupole mass filter; and a mass analyzer configured to receive either the primary ions or the product ions from the ion fragmentation or reaction cell, wherein the quadrupole mass filter is further configured to:

selectively isolate a subset of the primary ions received from the ion storage apparatus, whereby the isolated subset of ions has a selected mass-to-charge ratio (m/z) range, wherein an RF drive frequency that is applied to the quadrupole mass filter during the isolation is one of a pair of quadrupole RF drive frequencies that best optimizes isolation of the subset of primary ions that has the selected m/z range;

receive, from the ion fragmentation or reaction cell, a set of product ions generated from the isolated subset of the primary ions; and selectively isolate a subset of the of the product ions received from the ion fragmentation or reaction cell, wherein the RF drive frequency that is applied to the quadrupole mass filter during the isolation of the subset of the product ions is the other one of the pair of quadrupole RF drive frequencies.

8. A mass spectrometer system as recited in claim 7, further comprising an ion gate disposed between the ion source and the ion storage apparatus.

9. A mass spectrometer system as recited in claim 8, further comprising a second ion storage apparatus disposed between the ion fragmentation or reaction cell and the mass analyzer.

10. A mass spectrometer system as recited in claim 7, further comprising a second ion gate disposed between the ion fragmentation or reaction cell and the mass analyzer.

11. A mass spectrometer system comprising:

an ion source;

a branched ion guide configured to:

receive primary ions from the ion source; and receive product ions from a bypass ion pathway;

an ion storage apparatus configured to receive and store either the primary ions or the product ions from the branched ion guide;

a quadrupole mass filter configured to:

receive either the primary ions or product ions from the ion storage apparatus;

selectively isolate a subset of the primary ions or product ions received from the ion storage apparatus, whereby the isolated subset of ions has a selected mass-to-charge ratio (m/z) range, wherein:

if a subset of primary ions is selectively isolated, an RF drive frequency that is applied to the quadrupole mass filter during the isolation is one of a pair of quadrupole RF drive frequencies that best optimizes isolation of the primary ions; and if a subset of product ions is selectively isolated, the RF drive frequency that is applied to the quadrupole mass filter during the isolation is the other one of the pair of quadrupole RF drive frequencies;

an ion fragmentation or reaction cell configured to:

receive the selectively isolated subset of the primary ions or product ions from the quadrupole mass filter; and either generate product ions by reaction or fragmentation of the received primary ions or else generate second-generation product ions by reaction or fragmentation of the received product ions; and a switchable branched ion guide configured to transfer one or both of the selectively-isolated subset of the primary ions and the selectively-isolated subset of product ions to the bypass ion pathway or to transfer one or more of the selectively-isolated subset of primary ions, the selectively-isolated subset of product ions and the second-generation product ions to a mass analyzer.

* * * * *